US010601011B2

United States Patent
Yasuda et al.

(10) Patent No.: US 10,601,011 B2
(45) Date of Patent: Mar. 24, 2020

(54) COMPOSITION FOR SECONDARY BATTERY POROUS MEMBRANE, POROUS MEMBRANE FOR SECONDARY BATTERY, AND SECONDARY BATTERY

(71) Applicant: ZEON CORPORATION, Chiyoda-ku, Tokyo (JP)

(72) Inventors: Naohiro Yasuda, Tokyo (JP); Yujiro Toyoda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 241 days.

(21) Appl. No.: 15/580,790

(22) PCT Filed: Jun. 29, 2016

(86) PCT No.: PCT/JP2016/003127
§ 371 (c)(1),
(2) Date: Dec. 8, 2017

(87) PCT Pub. No.: WO2017/002366
PCT Pub. Date: Jan. 5, 2017

(65) Prior Publication Data
US 2018/0233725 A1     Aug. 16, 2018

(30) Foreign Application Priority Data
Jun. 29, 2015 (JP) ................................ 2015-130209

(51) Int. Cl.
*H01M 2/16* (2006.01)
*H01M 10/0525* (2010.01)

(52) U.S. Cl.
CPC ............. *H01M 2/166* (2013.01); *H01M 2/16* (2013.01); *H01M 10/0525* (2013.01)

(58) Field of Classification Search
None
See application file for complete search history.

(56) References Cited

U.S. PATENT DOCUMENTS

2011/0206963 A1   8/2011   Fujita et al.
2015/0372277 A1*   12/2015   Honda ................ H01M 2/1666
                                                  429/145

(Continued)

FOREIGN PATENT DOCUMENTS

CN        104425788 A     3/2015
CN        105493313 A     4/2016

(Continued)

OTHER PUBLICATIONS

Jan. 2, 2018, International Preliminary Report on Patentability issued in the International Patent Application No. PCT/JP2016/003127.

(Continued)

*Primary Examiner* — Alix E Eggerding
(74) *Attorney, Agent, or Firm* — Kenja IP Law PC

(57) ABSTRACT

Provided is a composition for a secondary battery porous membrane having excellent redispersibility. The composition for a secondary battery porous membrane contains inorganic oxide particles X, a metal hydroxide Y, a binder, and water. The metal hydroxide Y is a divalent or trivalent hydroxide, and is contained in an amount of at least 0.001 parts by mass and not more than 10 parts by mass per 100 parts by mass of the inorganic oxide particles X.

9 Claims, 1 Drawing Sheet

(56) References Cited

U.S. PATENT DOCUMENTS

2016/0156010 A1\* 6/2016 Chen .................. H01M 2/145
                                                            429/145
2017/0149037 A1   5/2017 Ogata

FOREIGN PATENT DOCUMENTS

| JP | 2012004103 A  | 1/2012  |
|----|---------------|---------|
| JP | 2013145763 A  | 7/2013  |
| JP | 2015218282 A  | 12/2015 |
| WO | 2013069383 A1 | 5/2013  |
| WO | 2013111345 A1 | 8/2013  |

OTHER PUBLICATIONS

Nov. 7, 2018, the Extended European Search Report issued by the European Patent Office in the corresponding European Patent Application No. 16817476.1.

\* cited by examiner

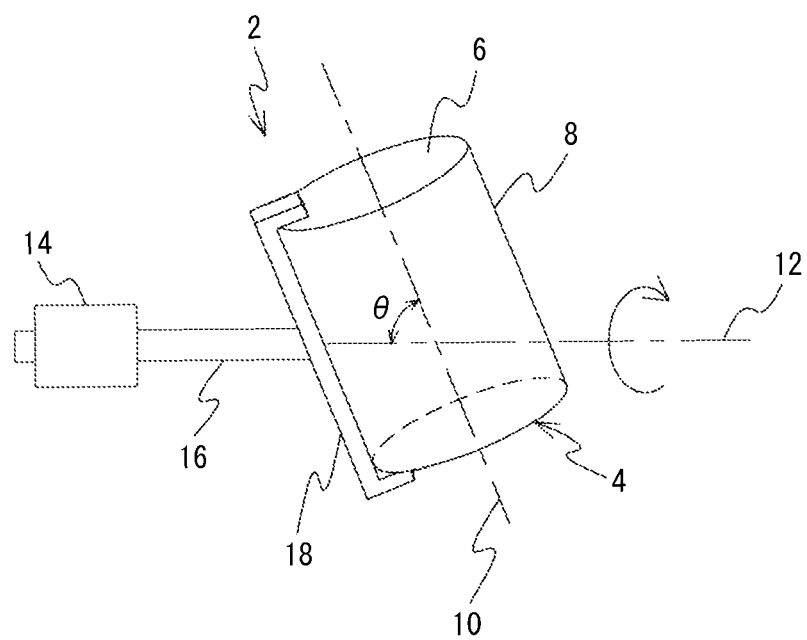

COMPOSITION FOR SECONDARY BATTERY POROUS MEMBRANE, POROUS MEMBRANE FOR SECONDARY BATTERY, AND SECONDARY BATTERY

TECHNICAL FIELD

This disclosure relates to a composition for a secondary battery porous membrane, a porous membrane for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as electrodes (positive electrode and negative electrode) and a separator that isolates the positive electrode and the negative electrode from one another and prevents short-circuiting between the positive and negative electrodes.

A battery member that includes a porous membrane as a protective layer may be conventionally used in a secondary battery with the aim of improving heat resistance and strength.

Specifically, the porous membrane may be a membrane that is formed by binding inorganic particles with a binder. A porous membrane of this type is normally formed by preparing a slurry composition (hereinafter, also referred to as a "composition for a porous membrane") containing inorganic particles and a binder dispersed in a dispersion medium, applying this composition for a porous membrane onto a separator substrate or an electrode substrate obtained by forming an electrode mixed material layer on a current collector, and then drying the composition for a porous membrane.

In recent years, there has been increased interest in the use of aqueous compositions for porous membranes (i.e., compositions in which an aqueous medium serves as a dispersion medium) in the production of porous membranes from viewpoints such as reduction of environmental impact. For example, PTL 1 reports a technique for forming a porous membrane having optimal porosity, excellent uniformity, and thermal stability using a composition for a porous membrane that contains a binder and an inorganic oxide powder having specific properties dispersed in a dispersion medium such as water.

CITATION LIST

Patent Literature

PTL 1: JP 2012-4103 A

SUMMARY

Technical Problem

Aggregation of components such as inorganic particles contained in an aqueous composition for a porous membrane during storage of the composition for a porous membrane is known to be problematic. Therefore, a composition for a porous membrane may be subjected to redispersion treatment, as necessary, directly before being applied onto a substrate such as an electrode substrate or separator substrate.

However, even when the above-described conventional composition for a porous membrane that contains an inorganic oxide powder is subjected to redispersion treatment after being stored for a long time, components that have aggregated are difficult to favorably redisperse in the aqueous medium, and it is difficult to ensure that sufficient dispersibility of the composition for a porous membrane is regained. Moreover, it has not been possible to obtain a homogeneous porous membrane using such a composition for a porous membrane, and the obtained porous membrane has poor adhesiveness to a substrate (peel strength) and does not enable a secondary battery to display excellent cycle characteristics.

Accordingly, an objective of this disclosure is to provide a means for advantageously solving the problems set forth above.

Solution to Problem

The inventors conducted diligent investigation with the aim of solving the problems set forth above. Through this investigation, the inventors discovered that a composition for a porous membrane having excellent redispersibility can be produced by using inorganic oxide particles X and a specific metal hydroxide Y in a specific ratio, and that a porous membrane obtained using this composition for a porous membrane has excellent peel strength and enables a secondary battery to display excellent cycle characteristics. The present disclosure was completed based on these discoveries.

Specifically, this disclosure aims to advantageously solve the problems set forth above by disclosing a composition for a secondary battery porous membrane comprising: inorganic oxide particles X; a metal hydroxide Y; a binder; and water, wherein the metal hydroxide Y is a divalent or trivalent hydroxide, and the metal hydroxide Y is contained in an amount of at least 0.001 parts by mass and not more than 10 parts by mass per 100 parts by mass of the inorganic oxide particles X. A composition for a porous membrane that contains both inorganic oxide particles X and above-described metal hydroxide Y in a specific ratio in this manner has excellent redispersibility, and a porous membrane obtained using this composition for a porous membrane has excellent peel strength and enables a secondary battery to display excellent cycle characteristics.

In the presently disclosed composition for a secondary battery porous membrane, the inorganic oxide particles X preferably have a specific surface area of at least 3 $m^2/g$ and not more than 10 $m^2/g$. Through use of inorganic oxide particles X having a specific surface area of at least 3 $m^2/g$ and not more than 10 $m^2/g$, heat resistance of a porous membrane can be increased while lowering water content in the porous membrane, and peel strength of the porous membrane can be further improved.

The "specific surface area" of the inorganic oxide particles X in this disclosure can be determined by the BET method and, more specifically, by a method described in the EXAMPLES section of the present specification.

In the presently disclosed composition for a secondary battery porous membrane, the inorganic oxide particles X preferably constitute a proportion of 50 mass % or more among total solid content. As a result of the proportion constituted by the inorganic oxide particles X among the total solid content being 50 mass % or more, heat resistance of an obtained porous membrane can be ensured.

The presently disclosed composition for a secondary battery porous membrane preferably further comprises a wetting agent. Through inclusion of the wetting agent in the composition for a porous membrane, the occurrence of cissing when the composition for a porous membrane is applied onto a substrate can be inhibited. This enables smooth application of the composition for a porous membrane and can further improve peel strength of an obtained porous membrane.

Moreover, in the presently disclosed composition for a secondary battery porous membrane, the wetting agent is preferably at least one selected from the group consisting of a non-ionic surfactant, a cationic surfactant, and an anionic surfactant. Through use of at least one of a non-ionic surfactant, a cationic surfactant, and an anionic surfactant as the wetting agent, the occurrence of cissing when the composition for a porous membrane is applied onto a substrate can be further inhibited.

In the presently disclosed composition for a secondary battery porous membrane, the wetting agent is preferably at least one selected from the group consisting of an ethylene oxide-propylene oxide copolymer and a monovalent low-molecular weight anionic surfactant. Through use of at least one of an ethylene oxide-propylene oxide copolymer and a monovalent low-molecular weight anionic surfactant as the wetting agent, the occurrence of cissing when the composition for a porous membrane is applied onto a substrate can be even further inhibited.

In the presently disclosed composition for a secondary battery porous membrane, the wetting agent is preferably contained in an amount of 0.05 parts by mass or more per 100 parts by mass of the inorganic oxide particles X. As a result of the amount of the wetting agent being 0.05 parts by mass or more per 100 parts by mass of the inorganic oxide particles X, the occurrence of cissing when the composition for a porous membrane is applied onto a substrate can be further inhibited.

In the presently disclosed composition for a secondary battery porous membrane, the inorganic oxide particles X have preferably undergone surface treatment with a reactive coupling agent. Moreover, in the presently disclosed composition for a secondary battery porous membrane, the metal hydroxide Y has preferably undergone surface treatment with a reactive coupling agent. Through use of inorganic oxide particles X and/or a metal hydroxide Y that have undergone surface treatment with a reactive coupling agent, redispersibility of the composition for a porous membrane can be further increased.

In the presently disclosed composition for a secondary battery porous membrane, the reactive coupling agent is preferably at least one selected from the group consisting of a titanium-based coupling agent, a silane coupling agent, and an aluminum-based coupling agent. Through use of inorganic oxide particles X and/or a metal hydroxide Y that have undergone surface treatment with at least one of the reactive coupling agents set forth above, redispersibility of the composition for a porous membrane can be even further increased.

Moreover, this disclosure aims to advantageously solve the problems set forth above by disclosing a porous membrane for a secondary battery formed from the composition for a secondary battery porous membrane set forth above. This porous membrane has excellent peel strength and enables a secondary battery to display excellent cycle characteristics.

Furthermore, this disclosure aims to advantageously solve the problems set forth above by disclosing a secondary battery comprising the porous membrane for a secondary battery set forth above. This secondary battery has excellent battery characteristics such as cycle characteristics.

Advantageous Effect

According to this disclosure, it is possible to provide a composition for a secondary battery porous membrane having excellent redispersibility.

Moreover, according to this disclosure, it is possible to provide a porous membrane for a secondary battery that has excellent peel strength and enables a secondary battery to display excellent cycle characteristics.

Furthermore, according to this disclosure, it is possible to provide a secondary battery having excellent cycle characteristics.

BRIEF DESCRIPTION OF THE DRAWING

In the accompanying drawing,
FIG. 1 illustrates an example of a stirring device used in redispersion treatment of a composition for a secondary battery porous membrane.

DETAILED DESCRIPTION

The following provides a detailed description of embodiments of the present disclosure.

The presently disclosed composition for a secondary battery porous membrane can be used as a material in production of the presently disclosed porous membrane for a secondary battery. Moreover, the presently disclosed porous membrane for a secondary battery is produced using the presently disclosed composition for a secondary battery porous membrane and constitutes part of a battery member such as a separator. Furthermore, the presently disclosed secondary battery includes at least the presently disclosed porous membrane for a secondary battery.

(Composition for Secondary Battery Porous Membrane)

The presently disclosed composition for a secondary battery porous membrane is a slurry composition in which water serves as a dispersion medium and that contains inorganic oxide particles X, a metal hydroxide Y, and a binder, and may optionally further contain additives and the like. The metal hydroxide Y contained in the composition for a secondary battery porous membrane is a divalent or trivalent hydroxide. Moreover, the metal hydroxide Y is contained in the composition for a secondary battery porous membrane in an amount of at least 0.001 parts by mass and not more than 10 parts by mass per 100 parts by mass of the inorganic oxide particles X.

The presently disclosed composition for a secondary battery porous membrane has excellent redispersibility as a result of the metal hydroxide Y being added in a specific quantity ratio relative to the inorganic oxide particles X. Moreover, a porous membrane that is formed using the composition for a porous membrane after redispersion thereof has excellent peel strength, and enables a secondary battery to display excellent cycle characteristics.

Although it is not yet clear why redispersibility of an aqueous composition for a porous membrane is increased through use of inorganic oxide particles X and a metal hydroxide Y in a specific ratio as described above, the reason is presumed to be as follows. Firstly, it is thought that water molecules are adsorbed onto the surfaces of the inorganic oxide particles X in the composition for a porous membrane and that liquid bridging force due to this adsorbed water promotes aggregation of the inorganic oxide particles X.

Moreover, the addition of the metal hydroxide Y is presumed to reduce the amount of water that is adsorbed as a result of, for example, the metal hydroxide Y being present in proximity to the surfaces of the inorganic oxide particles X. Therefore, even in a situation in which aggregates composed of solid content, such as the inorganic oxide particles X, are formed during long-term storage of the composition for a porous membrane, the solid content forming these aggregates can easily be redispersed by subjecting the composition for a porous membrane to redispersion treatment.

<Inorganic Oxide Particles X>

The inorganic oxide particles X are particles formed from an oxide of an inorganic material. Moreover, the inorganic oxide particles X are a component that exists stably in the environment of use of a secondary battery and that contributes to improving porous membrane heat resistance and strength. Examples of these inorganic oxide particles X include particles formed from various oxides (oxides of metals and oxides of metalloids) such as alumina (aluminum oxide, $Al_2O_3$), silica (silicon oxide, $SiO_2$), zirconia (zirconium oxide, $ZrO_2$), boron oxide ($B_2O_3$), magnesium oxide (MgO), and alumina-silica composite oxide. These inorganic oxide particles X may be subjected to element substitution, surface treatment, solid solution treatment, or the like as necessary. One of these types of particles may be used individually, or two or more of these types of particles may be used in combination in a freely selected ratio. Of these examples, alumina, silica, zirconia, and magnesium oxide are preferable, alumina is more preferable, and α-alumina is even more preferable from a viewpoint of inhibiting aggregation of the inorganic oxide particles X and further increasing the post-redispersion dispersibility of the composition for a porous membrane.

[Surface Treatment]

The inorganic oxide particles X described above have preferably undergone surface treatment with a reactive coupling agent from a viewpoint of further increasing redispersibility of the composition for a porous membrane. Examples of reactive coupling agents that can be used in this surface treatment include those described, for example, in JP 2015-218282 A and WO 2013/111345 A1. One of these reactive coupling agents may be used individually, or two or more of these reactive coupling agents may be used in combination in a freely selected ratio. Of these reactive coupling agents, titanium-based coupling agents (titanate coupling agents), silane coupling agents, and aluminum-based coupling agents (aluminate coupling agents) are preferable. Through use of inorganic oxide particles X that have undergone surface treatment using any of these reactive coupling agents, redispersibility of the composition for a porous membrane can be further increased.

No specific limitations are placed on the method by which the inorganic oxide particles X are surface treated using the reactive coupling agent. For example, the method of surface treatment may be a method in which the inorganic oxide particles X are immersed in or mixed with a solution obtained by dissolving the reactive coupling agent in a solvent, and then the solvent is removed by any suitable technique such as drying.

[Volume-Average Particle Diameter]

The volume-average particle diameter of the inorganic oxide particles X is preferably 0.1 μm or more, more preferably 0.2 μm or more, even more preferably 0.3 μm or more, and particularly preferably 0.4 μm or more, and is preferably 5.0 μm or less, more preferably 3.0 μm or less, even more preferably 2.0 μm or less, particularly preferably 1.0 μm or less, and most preferably 0.8 μm or less. When the volume-average particle diameter of the inorganic oxide particles X is 0.1 μm or more, excessively dense aggregation of the inorganic oxide particles X can be inhibited, and water can easily be removed from the composition for a porous membrane in formation of a porous membrane. This enables sufficient reduction of the water content in the resultant porous membrane and further improvement of secondary battery performance in terms of cycle characteristics and the like. On the other hand, when the volume-average particle diameter of the inorganic oxide particles X is 5.0 μm or less, sufficient packing density of the inorganic oxide particles X in a porous membrane can be ensured, and peel strength of the porous membrane can be further improved while increasing heat resistance of the porous membrane.

In this disclosure, the "volume-average particle diameter of the inorganic oxide particles X" can be determined as a particle diameter (D50) that, in a particle diameter distribution (volume basis) obtained through wet measurement using a laser diffraction particle diameter distribution analyzer, is a particle diameter at which the cumulative volume calculated from a small diameter end of the distribution reaches 50%.

The specific surface area of the inorganic oxide particles X is preferably 3 $m^2/g$ or more, more preferably 4 $m^2/g$ or more, and even more preferably 5 $m^2/g$ or more, and is preferably 10 $m^2/g$ or less, more preferably 9 $m^2/g$ or less, and even more preferably 8 $m^2/g$ or less. When the specific surface area of the inorganic oxide particles X is 3 $m^2/g$ or more, porous membrane peel strength can be further improved while increasing porous membrane heat resistance. On the other hand, when the specific surface area of the inorganic oxide particles X is 10 $m^2/g$ or less, the amount of water that is adsorbed onto the surfaces of the inorganic oxide particles X can be reduced, and thus the water content in a porous membrane obtained through drying can be sufficiently reduced.

[Amount]

Although the amount of the inorganic oxide particles X in the presently disclosed composition for a secondary battery porous membrane is not specifically limited, the amount when the total solid content in the composition for a porous membrane is taken to be 100 mass % is preferably 50 mass % or more, more preferably 70 mass % or more, even more preferably 80 mass % or more, and particularly preferably 90 mass % or more. When the proportion constituted by the inorganic oxide particles X among the total solid content of the composition for a porous membrane is 50 mass % or more, heat resistance of an obtained porous membrane can be ensured. Note that although no specific limitations are placed on the upper limit of the proportion constituted by the inorganic oxide particles X among the total solid content of the composition for a porous membrane, the upper limit is normally 99 mass % or less in order to ensure a sufficient amount of the binder and so forth.

<Metal Hydroxide Y>

The metal hydroxide Y may be a hydroxide of a divalent or trivalent metal element. Specific examples include aluminum hydroxide ($Al(OH)_3$), magnesium hydroxide ($Mg(OH)_2$), calcium hydroxide ($Ca(OH)_2$), chromium hydroxide ($Cr(OH)_2$), nickel hydroxide ($Ni(OH)_2$), and boric acid ($B(OH)_3$). One of these metal hydroxides may be used individually, or two or more of these metal hydroxides may be used in combination in a freely selected ratio. Of these examples, hydroxides of trivalent metals such as aluminum hydroxide and boric acid are preferable, and aluminum hydroxide is more preferable from a viewpoint of increasing redispersibility of the composition for a porous membrane.

The type of metal element included in the inorganic oxide particles X and the type of metal element included the metal hydroxide Y may be the same or different, and are preferably the same.

[Surface Treatment]

The metal hydroxide Y described above has preferably undergone surface treatment with a reactive coupling agent from a viewpoint of further increasing redispersibility of the composition for a porous membrane. Examples of reactive coupling agents that can be used in this surface treatment include those previously described in relation to the inorganic oxide particles X. Moreover, examples of preferable reactive coupling agents and the method of surface treatment using the reactive coupling agent may also be the same as previously described in relation to the inorganic oxide particles X.

[Volume-Average Particle Diameter]

The volume-average particle diameter of the metal hydroxide Y is preferably 0.1 μm or more, more preferably 0.2 μm or more, even more preferably 0.3 μm or more, and particularly preferably 0.5 μm or more, and is preferably 5.0 μm or less, more preferably 3.0 μm or less, even more preferably 2.0 μm or less, and particularly preferably 1.5 μm or less. When the volume-average particle diameter of particles of the metal hydroxide Y is 0.1 μm or more, porous membrane peel strength can be further increased while improving the Gurley value of the porous membrane. On the other hand, when the volume-average particle diameter of particles of the metal hydroxide Y is 5.0 μm or less, redispersibility of the composition for a porous membrane can be further increased.

In this disclosure, the "volume-average particle diameter of the metal hydroxide Y" can be determined as a particle diameter (D50) that, in a particle diameter distribution obtained through wet measurement using a laser diffraction particle diameter distribution analyzer, is a particle diameter at which the cumulative volume calculated from a small diameter end of the distribution reaches 50%.

A ratio of the volume-average particle diameter of the inorganic oxide particles X relative to the volume-average particle diameter of the metal hydroxide Y (X/Y particle diameter ratio) is preferably 0.1 or more, more preferably 0.2 or more, and even more preferably 0.3 or more, and is preferably 10 or less, more preferably 5 or less, and even more preferably 3 or less. When the X/Y particle diameter ratio is within any of the ranges set forth above, redispersibility of the composition for a porous membrane can be further increased.

Note that in a case in which two or more different types of inorganic oxide particles X are used, the "volume-average particle diameter of the inorganic oxide particles X" used in calculation of the X/Y particle diameter ratio is a weighted average value that takes into account the quantity ratio of the two or more different types of inorganic oxide particles X. Likewise, in a case in which two or more different types of metal hydroxides Y are used, the "volume-average particle diameter of the metal hydroxide Y" used in calculation of the X/Y particle diameter ratio is a weighted average value that takes into account the quantity ratio of the two or more different types of metal hydroxides Y.

[Amount]

The amount of the metal hydroxide Y in the presently disclosed composition for a secondary battery porous membrane per 100 parts by mass of the inorganic oxide particles X is required to be at least 0.001 parts by mass and not more than 10 parts by mass, is preferably 0.003 parts by mass or more, more preferably 0.005 parts by mass or more, and even more preferably 0.008 parts by mass or more, and is preferably 5 parts by mass or less, more preferably 3 parts by mass or less, and even more preferably 1 part by mass or less. If the amount of the metal hydroxide Y is less than 0.001 parts by mass per 100 parts by mass of the inorganic oxide particles X, redispersibility of the composition for a porous membrane deteriorates. On the other hand, if the amount of the metal hydroxide Y is more than 10 parts by mass per 100 parts by mass of the inorganic oxide particles X, redispersibility of the composition for a porous membrane deteriorates due to aggregation of the metal hydroxide Y, water content of an obtained porous membrane increases, and secondary battery cycle characteristics are reduced.

<Binder>

Examples of the binder contained in the presently disclosed composition for a secondary battery porous membrane include, but are not specifically limited to, known particulate binders (water-insoluble binders; also referred to as "particulate polymers") such as thermoplastic elastomers. Conjugated diene polymers and acrylic polymers are preferable, and acrylic polymers are more preferable as such thermoplastic elastomers from a viewpoint of binding capacity.

One binder may be used individually, or two or more binders may be used in combination.

The term "conjugated diene polymer" refers to a polymer that includes a conjugated diene monomer unit. Examples of conjugated diene monomers that can be used to form the conjugated diene monomer unit include aliphatic conjugated diene monomers such as 1,3-butadiene, 2-methyl-1,3-butadiene (isoprene), 2,3-dimethyl-1,3-butadiene, 2-chloro-1,3-butadiene (chloroprene), substituted linear conjugated pentadienes, and substituted and branched conjugated hexadienes. One of these conjugated diene monomers may be used individually, or two or more of these conjugated diene monomers may be used in combination. Moreover, the conjugated diene monomer unit may be hydrogenated. In other words, the term "conjugated diene monomer unit" is also inclusive of a structural unit obtained through hydrogenation of a conjugated diene monomer unit (hydrogenated conjugated diene unit).

Specific examples of the conjugated diene polymer include, but are not specifically limited to, a copolymer including an aromatic vinyl monomer unit and an aliphatic conjugated diene monomer unit such as a styrene-butadiene copolymer (SBR); butadiene rubber (BR); acrylic rubber (NBR) (copolymer including an acrylonitrile unit and a butadiene unit); and hydrogenated products thereof.

The phrase "includes a monomer unit" as used herein means that "a polymer obtained with the monomer includes a structural unit derived from the monomer".

The term "acrylic polymer" refers to a polymer that includes a (meth)acrylic acid ester monomer unit. Examples of (meth)acrylic acid ester monomers that can be used to form the (meth)acrylic acid ester monomer unit include alkyl esters of (meth)acrylic acid such as methyl acrylate, ethyl acrylate, butyl acrylate, methyl methacrylate, ethyl methacrylate, and 2-ethylhexyl acrylate. Note that in this disclosure, "(meth)acryl" is used to indicate "acryl" and/or "methacryl". One of these (meth)acrylic acid ester monomers may be used individually, or two or more of these (meth)acrylic acid ester monomers may be used in combination.

The proportion in which the (meth)acrylic acid ester monomer unit is included in the acrylic polymer is preferably at least 80 mass % and not more than 96 mass %, but is not specifically limited to this range.

It is more preferable that the acrylic polymer includes a (meth)acrylonitrile monomer unit. Inclusion of the (meth) acrylonitrile monomer unit in the acrylic polymer can increase porous membrane strength. Note that in this disclosure, "(meth)acrylonitrile" is used to indicate "acrylonitrile" and/or "methacrylonitrile". One type of (meth)acrylonitrile monomer unit may be used individually, or two or more types of (meth)acrylonitrile monomer units may be used in combination.

The proportion in which the (meth)acrylonitrile monomer unit is included in the acrylic polymer is preferably at least 0.1 mass % and not more than 5 mass %.

The particulate binder preferably includes an acidic group-containing monomer unit. Binding performance of the particulate binder is increased when the particulate binder includes an acidic group-containing monomer unit. As a consequence, porous membrane peel strength and secondary battery cycle characteristics can be further increased.

The term "acidic group-containing monomer unit" refers to a structural unit having a structure formed through polymerization of an acidic group-containing monomer. Moreover, the term "acidic group-containing monomer" refers to a monomer that has an acidic group.

Examples of acidic group-containing monomers that can be used to form the acidic group-containing monomer unit include carboxylic acid group-containing monomers, sulfonate group-containing monomers, and phosphate group-containing monomers.

Examples of carboxylic acid group-containing monomers include monocarboxylic acids, derivatives of monocarboxylic acids, dicarboxylic acids, and acid anhydrides of dicarboxylic acids.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids.

Examples of sulfonate group-containing monomers include vinyl sulfonic acid, methyl vinyl sulfonic acid, (meth)allyl sulfonic acid, styrene sulfonic acid, (meth) acrylic acid-2-ethyl sulfonate, 2-acrylamido-2-methylpropane sulfonic acid, 3-allyloxy-2-hydroxypropane sulfonic acid, and 2-(N-acryloyl)amino-2-methyl-1,3-propane-disulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

One of these acidic group-containing monomers may be used individually, or two or more of these acidic group-containing monomers may be used in combination. Of these acidic group-containing monomers, carboxylic acid group-containing monomers are preferable, acrylic acid and methacrylic acid are more preferable, and methacrylic acid is even more preferable.

The proportion in which the acidic group-containing monomer unit is included in the particulate binder is preferably 0.1 mass % or more, and more preferably 0.5 mass % or more, and is preferably 5 mass % or less, and more preferably 4 mass % or less. When the percentage content of the acidic group-containing monomer unit in the particulate binder is within any of the ranges set forth above, porous membrane peel strength and secondary battery cycle characteristics can be even further increased.

The particulate binder preferably includes a crosslinkable monomer unit. Through inclusion of a crosslinkable monomer unit in the particulate binder, elution of the particulate binder into electrolysis solution can be inhibited. As a result, secondary battery cycle characteristics can be further increased.

Crosslinkable monomers that can be used to form the crosslinkable monomer unit are typically monomers that are thermally crosslinkable. More specific examples of crosslinkable monomers that can be used include monofunctional monomers having a thermally crosslinkable group and one olefinic double bond per molecule, and multifunctional monomers having two or more olefinic double bonds per molecule.

Examples of thermally crosslinkable groups include an epoxy group, an N-methylol amide group, an oxetanyl group, an oxazoline group, and combinations thereof. Of these thermally crosslinkable groups, an epoxy group and an N-methylol amide group are preferable, and an epoxy group is particularly preferable in terms of ease with which crosslinking and crosslink density can be adjusted.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allylphenyl glycidyl ether; monoepoxides of dienes and polyenes; alkenyl epoxides; and glycidyl esters of unsaturated carboxylic acids such as glycidyl acrylate and glycidyl methacrylate.

Examples of crosslinkable monomers having an N-methylol amide group as a thermally crosslinkable group and having an olefinic double bond include (meth)acrylamides having a methylol group such as N-methylol(meth)acrylamide.

Examples of multifunctional monomers having two or more olefinic double bonds include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinyl benzene.

In this disclosure, "(meth)acrylate" is used to indicate "acrylate" and/or "methacrylate".

One of these crosslinkable monomers may be used individually, or two or more of these crosslinkable monomers may be used in combination. Of these crosslinkable monomers, a crosslinkable monomer having an epoxy group or an N-methylol amide group as a thermally crosslinkable group and having an olefinic double bond is preferable, and allyl glycidyl ether and N-methylolacrylamide are more preferable.

The proportion in which the crosslinkable monomer unit is included in the particulate binder is preferably 0.1 mass % or more, and more preferably 0.5 mass % or more, and is preferably 5 mass % or less, and more preferably 4 mass % or less. When the percentage content of the crosslinkable monomer unit in the particulate binder is within any of the ranges set forth above, secondary battery cycle characteristics can be even further increased.

[Glass Transition Temperature]

The glass transition temperature of the polymer used as the binder is preferably 20° C. or lower, more preferably 0° C. or lower, and even more preferably −10° C. or lower. When the glass transition temperature is 20° C. or lower, the binder displays sufficiently high adhesiveness. As a result, components contained in a porous membrane can be sufficiently inhibited from detaching from the porous membrane and porous membrane peel strength can be sufficiently increased. Note that the glass transition temperature of the polymer used as the binder is normally −50° C. or higher. The glass transition temperature of the polymer can be measured in accordance with JIS K 7121.

[Volume-Average Particle Diameter]

The volume-average particle diameter of the binder (particulate binder) is preferably 50 nm or more, more preferably 100 nm or more, and even more preferably 200 nm or more, and is preferably 600 nm or less, more preferably 500 nm or less, and even more preferably 400 nm or less. As a result of the volume-average particle diameter of the particulate binder being 50 nm or more, dispersibility of the particulate binder can be increased. Moreover, it is possible to inhibit the particulate binder becoming densely packed in a porous membrane, the Gurley value of the porous membrane being increased, and internal resistance of a secondary battery being increased. Moreover, when the volume-average particle diameter of the particulate binder is 600 nm or less, detachment of components such as the inorganic oxide particles X from the porous membrane can be sufficiently prevented, and porous membrane peel strength can be increased.

In this disclosure, the "volume-average particle diameter of the particulate binder" refers to a particle diameter (D50) that, in a particle diameter distribution (volume basis) measured by laser diffraction in accordance with JIS Z 8825, is a particle diameter at which the cumulative volume calculated from a small diameter end of the distribution reaches 50%.

[Amount]

The amount of the binder in the composition for a secondary battery porous membrane per 100 parts by mass of the inorganic oxide particles X is preferably 1 part by mass or more, more preferably 2 parts by mass or more, and even more preferably 3 parts by mass or more, and is preferably 20 parts by mass or less, more preferably 15 parts by mass or less, and even more preferably 10 parts by mass or less. By setting the amount of the binder as 1 part by mass or more per 100 parts by mass of the inorganic oxide particles X, detachment of the inorganic oxide particles X from a porous membrane can be sufficiently prevented, and porous membrane peel strength can be increased. Moreover, by setting the amount of the binder as 20 parts by mass or less per 100 parts by mass of the inorganic oxide particles X, the Gurley value of the porous membrane can be ensured and an increase in secondary battery internal resistance can be suppressed.

The above-described polymer that may be used as the binder can be produced, for example, by solution polymerization, suspension polymerization, emulsion polymerization, or the like. Of these methods, emulsion polymerization and suspension polymerization are preferable in terms that polymerization can be carried out in water and a resultant water dispersion containing the binder can be suitably used, as produced, as a material in the composition for a porous membrane.

<Additives>

The composition for a secondary battery porous membrane may optionally further contain other components besides the components described above. These other components are not specifically limited so long as they do not influence the battery reactions. One of such other components may be used individually, or two or more of such other components may be used in combination.

Examples of other components that can be used include additives such as dispersants, thickeners, and wetting agents.

[Dispersant]

Herein, a water-soluble low-molecular weight polymer may be used as a dispersant. In this disclosure, "low-molecular weight polymer" refers to a polymer having a weight average molecular weight of more than 2,000 and less than 110,000, and "high-molecular weight polymer" refers to a polymer having a weight average molecular weight of 110,000 or more. The "weight average molecular weight" of a polymer can be measured by a method described in the EXAMPLES section of the present specification. Moreover, when a polymer is referred to as "water-soluble" in the present disclosure, this means that when 0.5 g of the polymer is dissolved in 100 g of water at 25° C., insoluble content is less than 0.5 mass %.

Examples of dispersants that can be used include water-soluble polymers including an acidic group-containing monomer unit (inclusive of salts thereof such as ammonium salts and alkali metal salts). The water-soluble polymer including an acidic group-containing monomer unit includes an acidic group in the water-soluble polymer itself. Through the action of this acidic group, dispersing performance with respect to the inorganic oxide particles X and the like in the composition for a porous membrane can be increased, and redispersibility of the composition for a porous membrane can be further improved.

Moreover, as previously explained, the metal hydroxide Y is presumed to contribute to reducing the amount of water adsorbed onto the surfaces of the inorganic oxide particles X in the presently disclosed composition for a porous membrane. Therefore, it is thought that when a dispersant is compounded in the presently disclosed composition for a porous membrane, a large amount of dispersant that is not taken in by the adsorbed water is present, and this dispersant can further contribute to dispersion stability of the inorganic oxide particles X and the like.

It should be noted that non-ionic surfactants such as an ethylene oxide-propylene oxide copolymer that can be used as the subsequently described "wetting agent" are not considered to be included among "dispersants" in this disclosure.

Examples of acidic group-containing monomers that can be used to form the acidic group-containing monomer unit include the same monomers as previously described in the "Binder" section. One acidic group-containing monomer may be used individually, or two or more acidic group-containing monomers may be used in combination. Of these acidic group-containing monomers, it is preferable to use either or both of a carboxylic acid group-containing monomer and a sulfonate group-containing monomer, and more preferable to use both a carboxylic acid group-containing monomer and a sulfonate group-containing monomer from a viewpoint of further improving redispersibility of the composition for a porous membrane. In other words, a water-soluble polymer serving as a dispersant preferably includes either or both of a carboxylic acid group-containing monomer unit and a sulfonate group-containing monomer unit, and more preferably includes both a carboxylic acid group-containing monomer unit and a sulfonate group-containing monomer unit.

In a case in which a water-soluble polymer used as a dispersant includes both a carboxylic acid group-containing monomer unit and a sulfonate group-containing monomer unit, a ratio, by mass, of the percentage content of the sulfonate group-containing monomer unit relative to the percentage content of the carboxylic acid group-containing monomer unit in the water-soluble polymer (sulfonate group/carboxylic acid group monomer ratio) is preferably 1/999 or more, and more preferably 0.01 or more, and is preferably 1 or less, more preferably 0.5 or less, and even more preferably 0.3 or less. When the carboxylic acid group/sulfonate group monomer ratio is 1/999 or more, an increase in viscosity caused by use of the dispersant can be suppressed and stability of the composition for a porous membrane can be increased. On the other hand, when the carboxylic acid group/sulfonate group monomer ratio is 1 or less, the dispersant can be favorably adsorbed by the inorganic oxide particles X and the like, which can increase dispersing performance with respect to the inorganic oxide particles X and the like, and further improve redispersibility of the composition for a porous membrane.

Examples of suitable water-soluble polymers that can be used as dispersants include a copolymer including an acrylic acid unit and a sulfonic acid unit (acrylic acid-sulfonic acid copolymer), a copolymer including an acrylic acid unit and a maleic acid unit (acrylic acid-maleic acid copolymer), a low-molecular weight polymer composed of only acrylic acid units (low-molecular weight polyacrylic acid), and salts thereof. Of these water-soluble polymers, an acrylic acid-sulfonic acid copolymer and salts thereof are preferable from a viewpoint of further improving redispersibility of the composition for a porous membrane.

The above-described water-soluble polymer that is used as a dispersant can be polymerized by a known method.

Also note that the water-soluble polymer used as a dispersant may include monomer units other than the acidic group-containing monomer unit. The percentage content of the acidic group-containing monomer unit in the water-soluble polymer is preferably 80 mass % or more, more preferably 90 mass % or more, even more preferably 95 mass % or more, and particularly preferably 100 mass %.

The weight average molecular weight of the water-soluble polymer used as a dispersant is preferably 3,000 or more, and more preferably 4,000 or more. Moreover, the weight average molecular weight is required to be less than 110,000, and is preferably 100,000 or less, more preferably 12,000 or less, and even more preferably 10,000 or less. When the weight average molecular weight of the water-soluble polymer used as a dispersant is within any of the ranges set forth above, redispersibility of the composition for a porous membrane can be further improved while suppressing an increase in viscosity caused by use of the dispersant.

The amount of the water-soluble polymer used as a dispersant in the composition for a porous membrane per 100 parts by mass of the inorganic oxide particles X is preferably 0.05 parts by mass or more, and more preferably 0.1 parts by mass or more, and is preferably 2 parts by mass or less, more preferably 1 part by mass or less, and even more preferably 0.8 parts by mass or less. When the amount of the water-soluble polymer is 0.05 parts by mass or more per 100 parts by mass of the inorganic oxide particles X, redispersibility of the composition for a porous membrane can be further improved, and when the amount of the water-soluble polymer is 2 parts by mass or less per 100 parts by mass of the inorganic oxide particles X, an increase in viscosity caused by use of the dispersant can be suppressed, and stability of the composition for a porous membrane can be increased.

[Thickener]

Herein, a water-soluble high-molecular weight polymer may be used as a thickener.

Known thickeners can be used without any specific limitations. However, examples that are preferable from a viewpoint of increasing porous membrane heat contraction resistance include water-soluble polymers (inclusive of salts thereof) such as carboxymethyl cellulose, polyacrylamide, polyvinyl alcohol, and a high-molecular weight polymer composed of only acrylic acid units (high-molecular weight polyacrylic acid). The weight average molecular weight of the thickener is required to be 110,000 or more, and is preferably 1,000,000 or less. One of these thickeners may be used individually, or two or more of these thickeners may be used in combination.

It should be noted that non-ionic surfactants such as an ethylene oxide-propylene oxide copolymer that can be used as the subsequently described "wetting agent" are not considered to be included among "thickeners" in this disclosure.

The amount of the thickener in the composition for a porous membrane per 100 parts by mass of the inorganic oxide particles X is preferably 0.1 parts by mass or more, more preferably 0.5 parts by mass or more, and even more preferably 1 part by mass or more, and is preferably 10 parts by mass or less, more preferably 3 parts by mass or less, and even more preferably 2 parts by mass or less. Setting the amount of the thickener as 0.1 parts by mass or more per 100 parts by mass of the inorganic oxide particles X increases porous membrane heat contraction resistance, whereas setting the amount of the thickener as 10 parts by mass or less per 100 parts by mass of the inorganic oxide particles X facilitates application of the composition for a porous membrane with an appropriate thickness in application onto a substrate.

[Wetting Agent]

Although no specific limitations are placed on wetting agents that can be used, from a viewpoint of inhibiting cissing and facilitating application with an appropriate thickness in application of the composition for a porous membrane onto a substrate and from a viewpoint of further increasing porous membrane peel strength, surfactants such as non-ionic surfactants, cationic surfactants, and anionic surfactants are preferable, and non-ionic surfactants and anionic surfactants are more preferable. A surfactant used as a wetting agent preferably has a molecular weight of 2,000 or less.

Examples of suitable non-ionic surfactants include an ethylene oxide-propylene oxide copolymer and a polyoxyethylene polycyclic phenyl ether (represented by a formula $RO(CH_2CH_2O)_nH$, where R is a polycyclic phenyl group, and n is a positive integer (for example, at least 2 and not more than 40)).

Low-molecular weight anionic surfactants are suitable as anionic surfactants. In this disclosure, "low-molecular weight anionic surfactant" refers to an anionic surfactant having a molecular weight of 1,000 or less. Examples of low-molecular weight anionic surfactants include alkyl sulfonic acids, sodium alkyl sulfonates, lithium alkyl sulfonates, alkylbenzene sulfonic acids, sodium linear alkylbenzene sulfonates (LAS), lithium linear alkylbenzene sulfonates, fatty acid sodium salts, fatty acid lithium salts, alpha-sulfonated fatty acid ester sodium salts, alpha-sulfonated fatty acid ester lithium salts, sodium alkyl sulfates (AS), lithium alkyl sulfates, sodium alkyl ether sulfates (AES), lithium alkyl ether sulfates, sodium alpha-olefin sulfonates (AOS), and lithium alpha-olefin sulfonates.

Moreover, the anionic surfactant is preferably a monovalent anionic surfactant. In this disclosure, when an anionic surfactant is described as "monovalent", this means that the anionic surfactant includes only one anionic group (carboxylic acid group, sulfonate group, or the like) in individual molecules thereof.

Of such examples, non-ionic surfactants such as an ethylene oxide-propylene oxide copolymer are suitable as wetting agents. Moreover, it is preferable to use a non-ionic surfactant and an anionic surfactant in combination as wetting agents, and more preferable to use an ethylene oxide-propylene oxide copolymer and a monovalent low-molecular weight anionic surfactant in combination as wetting agents. Through combined use of the two types of wetting agents described above, the amount of wetting agent that is used can be reduced, a sufficient dispersing effect can be obtained, and secondary battery cycle characteristics can be further increased.

The amount of wetting agent that is compounded per 100 parts by mass of the inorganic oxide particles X is preferably 0.05 parts by mass or more, more preferably 0.1 parts by mass or more, and even more preferably 0.15 parts by mass or more, and is preferably 2 parts by mass or less, more preferably 1.5 parts by mass or less, and even more preferably 1 part by mass or less. Setting the amount of the wetting agent as 0.05 parts by mass or more per 100 parts by mass of the inorganic oxide particles X can ensure wettability of the composition for a porous membrane with a substrate and inhibit the occurrence of cissing, whereas setting the amount of the wetting agent as 2 parts by mass or less per 100 parts by mass of the inorganic oxide particles X can suppress an increase in internal resistance caused by lowering of the Gurley value of a porous membrane.

<Production of Composition for Secondary Battery Porous Membrane>

The method by which the composition for a secondary battery porous membrane is produced is not specifically limited. However, the composition for a secondary battery porous membrane can normally be produced by mixing the above-described inorganic oxide particles X, metal hydroxide Y, binder, and optional additives that are used as necessary, in the presence of a dispersion medium that includes water. Although no specific limitations are placed on the mixing method, the mixing is performed using a disperser as a mixing apparatus in order to efficiently disperse the components.

The disperser is preferably a device that can homogeneously disperse and mix the components. Examples of such devices include a ball mill, a sand mill, a pigment disperser, a grinding machine, an ultrasonic disperser, a homogenizer, and a planetary mixer. Of these examples, a high-level dispersing device such as a bead mill, a roll mill, or a FILMIX is particularly preferable since these devices can impart high dispersing shear.

In production of the composition for a porous membrane set forth above, the inorganic oxide particles X and the metal hydroxide Y are preferably dry mixed in advance of mixing with the binder and the water-containing dispersion medium. This pre-mixing can further increase redispersibility of the resultant composition for a porous membrane. In this disclosure, "dry mixing" refers to mixing in which the solid content concentration of a mixture during mixing is more than 90 mass %.

The solid content concentration of the composition for a porous membrane can normally be freely set within a range in which the composition for a porous membrane has a viscosity within a range that does not cause loss of workability during production of a porous membrane. Specifically, the solid content concentration of the composition for a porous membrane may normally be 10 mass % to 60 mass %.

(Porous Membrane for Secondary Battery)

The presently disclosed porous membrane for a secondary battery can be formed by removing the dispersion medium, such as water, from the composition for a secondary battery porous membrane set forth above. In other words, the presently disclosed porous membrane for a secondary battery normally contains the inorganic oxide particles X, the metal hydroxide Y, and the binder, and may optionally further contain additives and the like. Note that the ratio of components contained in the presently disclosed porous membrane for a secondary battery is normally the same as the ratio of components contained in the presently disclosed composition for a porous membrane set forth above. Moreover, the preferred ratio of these components in the porous membrane for a secondary battery is normally the same as the preferred ratio of these components in the composition for a porous membrane set forth above.

The presently disclosed porous membrane for a secondary battery may, for example, be obtained as a shaped product composed of a dried product of the composition for a porous membrane set forth above by applying the composition for a porous membrane onto the surface of an appropriate substrate to form an applied membrane and then drying the applied membrane that is formed. Note that in a case in which the above-described binder includes a crosslinkable monomer unit, the binder including this crosslinkable monomer unit may be crosslinked in drying of the composition for a secondary battery porous membrane or may be crosslinked in optional heat treatment performed after the drying (i.e., the porous membrane for a secondary battery may contain a crosslinked product of the above-described binder). As a result of the presently disclosed porous membrane for a secondary battery being formed using the composition for a secondary battery porous membrane set forth above, the presently disclosed porous membrane for a secondary battery can display excellent peel strength and enables a secondary battery including the porous membrane to display excellent cycle characteristics.

<Substrate>

There are no limitations on the substrate onto which the composition for a porous membrane is applied. For example, an applied membrane of the composition for a porous membrane may be formed on the surface of a detachable substrate, the applied membrane may be dried to form a porous membrane, and then the detachable substrate may be peeled from the porous membrane. The porous membrane peeled from the detachable substrate as described above can be used as a free-standing membrane in formation of a battery member of a secondary battery. Specifically, the porous membrane peeled from the detachable substrate may be stacked on a separator substrate to form a separator that includes the porous membrane, or the porous membrane peeled from the detachable substrate may be stacked on an electrode substrate to form an electrode that includes the porous membrane.

However, from a viewpoint of omitting a step of peeling the porous membrane and improving battery member production efficiency, it is preferable that a separator substrate or an electrode substrate is used as the substrate. The porous membrane provided on the separator substrate or electrode substrate can be suitably used as a protective layer for improving heat resistance, strength, and the like of a separator or an electrode.

[Separator Substrate]

Any known separator substrate such as an organic separator substrate may be used without any specific limitations. The organic separator substrate is a porous member that is made from an organic material. Examples of organic separator substrates include microporous membranes and non-woven fabrics containing a polyolefin resin such as polyethylene or polypropylene, an aromatic polyamide resin, or the like. A microporous membrane or non-woven fabric made from polyethylene is preferable due to having excellent strength. Although the separator substrate may be any thickness, the thickness is preferably 0.5 µm or more, and more preferably 5 µm or more, and is preferably 40 µm or less, more preferably 30 µm or less, and even more preferably 20 µm or less.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and a binder for an electrode mixed material layer (binder for positive/negative electrode mixed material layer) in the electrode mixed material layer, and the method by which the electrode mixed material layer is formed on the current collector may be known examples thereof such as described, for example, in JP 2013-145763 A.

<Formation Method of Porous Membrane for Secondary Battery>

Examples of methods by which the porous membrane may be formed on a substrate such as the above-described separator substrate or electrode substrate include:

(1) a method involving applying the presently disclosed composition for a secondary battery porous membrane onto the surface of the separator substrate or electrode substrate (surface at the electrode mixed material layer side in the case of the electrode substrate; same applies below), and subsequently drying the composition;

(2) a method involving immersing the separator substrate or electrode substrate in the presently disclosed composition for a secondary battery porous membrane, and subsequently drying the separator substrate or electrode substrate; and (3) a method involving applying the presently disclosed composition for a secondary battery porous membrane onto a detachable substrate, drying the composition to produce a porous membrane, and then transferring the obtained porous membrane onto the surface of the separator substrate or electrode substrate.

Of these methods, the method described in (1) is particularly preferable since it allows the thickness of the porous membrane to be easily controlled. More specifically, the method described in (1) includes a step of applying the composition for a porous membrane onto the substrate (application step) and a step of drying the composition for a porous membrane that has been applied onto the substrate to form a porous membrane (porous membrane formation step).

[Application Step]

No specific limitations are placed on the method by which the composition for a porous membrane is applied onto the substrate in the application step. Examples of application methods that can be used include doctor blading, reverse roll coating, direct roll coating, gravure coating, extrusion coating, and brush coating.

[Porous Membrane Formation Step]

The method by which the composition for a porous membrane is dried on the substrate in the porous membrane formation step is not specifically limited and may be a commonly known method. Examples of drying methods that can be used include drying by warm, hot, or low-humidity air; drying in a vacuum; and drying by irradiation with infrared light or electron beams. Although no specific limitations are placed on the drying conditions, the drying temperature is preferably 50° C. to 150° C., and the drying time is preferably 5 minutes to 30 minutes.

<Thickness of Porous Membrane>

The thickness of the porous membrane that is formed on the substrate is preferably 0.01 µm or more, more preferably 0.1 µm or more, and even more preferably 1 µm or more, and is preferably 20 µm or less, more preferably 10 µm or less, and even more preferably 5 µm or less. Sufficient porous membrane strength can be ensured through the thickness of the porous membrane being 0.01 µm or more, and diffusivity of an electrolysis solution can be ensured and secondary battery output characteristics can be improved through the thickness of the porous membrane being 20 µm or less.

(Battery Member Including Porous Membrane)

A battery member (separator or electrode) that includes the presently disclosed porous membrane may, in addition to the separator substrate or electrode substrate and the presently disclosed porous membrane, further include elements other than the presently disclosed porous membrane so long as the effects disclosed herein are not significantly lost.

These elements other than the presently disclosed porous membrane are not specifically limited other than not being elements that correspond to the presently disclosed porous membrane, and examples thereof include an adhesive layer that is provided on the presently disclosed porous membrane in order to adhere battery members to one another.

(Secondary Battery)

The presently disclosed secondary battery may be a non-aqueous secondary battery, a representative example of which is a lithium ion secondary battery. The presently disclosed secondary battery includes the presently disclosed porous membrane for a secondary battery set forth above. More specifically, the presently disclosed secondary battery includes a positive electrode, a negative electrode, a separator, and an electrolysis solution, wherein at least one battery member among the positive electrode, the negative electrode, and the separator includes the porous membrane for a secondary battery set forth above. The presently disclosed secondary battery displays excellent battery characteristics (for example, cycle characteristics) as a result of including a porous membrane obtained from the presently disclosed composition for a secondary battery porous membrane.

<Positive Electrode, Negative Electrode, and Separator>

At least one of the positive electrode, the negative electrode, and the separator used in the presently disclosed secondary battery includes the presently disclosed porous membrane. Specifically, an electrode produced by providing the presently disclosed porous membrane on an electrode substrate obtained by forming an electrode mixed material layer on a current collector can be used as a positive electrode or negative electrode that includes a porous membrane. Moreover, a separator produced by providing the presently disclosed porous membrane on a separator substrate can be used as a separator that includes a porous membrane. The electrode substrate and the separator substrate may be any of the examples previously described in the "Porous membrane for secondary battery" section.

On the other hand, an electrode formed from the above-described electrode substrate or a separator formed from the above-described separator substrate may be used without any specific limitations as a positive electrode, negative electrode, or separator that does not include a porous membrane.

<Electrolysis Solution>

The electrolysis solution is normally an organic electrolysis solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO_2)NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolysis solution so long as the supporting electrolyte dissolves therein. Suitable examples in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such organic solvents may be used. Of these organic solvents, carbonates are preferable in terms of having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolysis solution may be adjusted as appropriate. Furthermore, known additives may be added to the electrolysis solution.

<Production Method of Secondary Battery>

The presently disclosed secondary battery set forth above can be produced by, for example, stacking the positive electrode and the negative electrode with the separator in-between, performing rolling, folding, or the like of the resultant stack as necessary to place the resultant stack in a battery container, injecting the electrolysis solution into the battery container, and sealing the battery container. At least one member among the positive electrode, the negative electrode, and the separator is a porous membrane-equipped member. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the polymer.

The following methods were used in the examples and comparative examples to measure and evaluate the volume-average particle diameter of inorganic oxide particles X and a metal hydroxide Y, the specific surface area of inorganic oxide particles X and a metal hydroxide Y, the glass transition temperature and volume-average particle diameter of a binder, the weight average molecular weight of a polymer, the redispersibility of a composition for a porous membrane, the water content of a separator, the peel strength of a porous membrane, and the cycle characteristics of a secondary battery.

<Volume-Average Particle Diameter of Inorganic Oxide Particles X and Metal Hydroxide Y>

The volume-average particle diameter of inorganic oxide particles X and a metal hydroxide Y was determined as a particle diameter that, in a particle diameter distribution obtained through wet measurement of a powder of the inorganic oxide particles X or the metal hydroxide Y using a laser diffraction particle diameter distribution analyzer (SALD-3100 produced by Shimadzu Corporation), was a particle diameter at which the cumulative volume calculated from a small diameter end of the distribution reached 50%.

<Specific Surface Area of Inorganic Oxide Particles X and Metal Hydroxide Y>

The BET specific surface area of inorganic particles was determined using a wet specific surface area measuring device (FlowSorb III 2305 produced by Shimadzu Corporation).

<Glass Transition Temperature of Binder>

A DSC curve was measured in accordance with JIS K 7121 using a differential scanning calorimeter (produced by SII NanoTechnology Inc.; product name: EXSTAR DSC6220). Specifically, 10 mg of a dried measurement sample was weighed into an aluminum pan, and a DSC curve was measured at normal temperature and pressure in a measurement range of −100° C. to 500° C. and at a heating rate of 10° C./minute, with an empty aluminum pan as a reference. The glass transition temperature was determined from an intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak.

<Volume Average Particle Diameter of Binder>

The volume-average particle diameter of a binder was determined as a particle diameter that, in a particle diameter distribution (volume basis) measured in accordance with JIS Z 8825 using a laser diffraction particle diameter distribution analyzer (produced by Shimadzu Corporation; product name: SALD-7100) with respect to a water dispersion adjusted to a solid content concentration of 0.1 mass %, was a particle diameter at which the cumulative volume calculated from a small diameter end of the distribution reached 50%.

<Weight Average Molecular Weight of Polymer>

The weight average molecular weight of a polymer was measured by gel permeation chromatography (GPC) under the following measurement conditions using a LiBr-NMP solution of 10 mM in concentration.

Separation column: Shodex KD-806M (produced by Showa Denko K.K.)
Detector: Differential refractometer RID-10A (produced by Shimadzu Corporation)
Eluent flow rate: 0.3 mL/minute
Column temperature: 40° C.
Standard polymer: TSK standard polystyrene (produced by Tosoh Corporation)

<Redispersibility of Composition for Porous Membrane>

After a composition for a porous membrane had been stored for a specific time and then subjected to redispersion treatment, approximately 1 kg of the composition for a porous membrane was filtered through 635-mesh SUS wire mesh. Next, material collected on the wire mesh was washed with deionized water and was subsequently dried for 1 hour at 105° C. The wire mesh having the dried collected material attached thereto was weighed and the amount of mesh residue was calculated by the following formula.

Amount of mesh residue (mass ppm)=$(a-b)/(c \times d/100) \times 1{,}000{,}000$ a: Mass (g) of wire mesh having dried collected material attached thereto
b: Mass (g) of wire mesh
c: Mass (g) of composition for a porous membrane
d: Solid content concentration (mass %) of composition for a porous membrane The determined amount of mesh residue was used in evaluation by the following criteria. A smaller amount of mesh residue indicates better post-redispersion treatment dispersibility of the composition for a porous membrane.

A: Amount of mesh residue of less than 50 mass ppm
B: Amount of mesh residue of at least 50 mass ppm and less than 150 mass ppm
C: Amount of mesh residue of at least 150 mass ppm and less than 450 mass ppm
D: Amount of mesh residue of 450 mass ppm or more <Water Content of Separator>

A separator (porous membrane-equipped) was cut out to a size of 10 cm×10 cm to obtain a test piece. The test piece was left for 24 hours in an atmosphere having a temperature of 25° C. and a dew point of −60° C. Thereafter, the water content W (mass ppm) of the test piece was measured by the Karl Fischer method (water vaporization method of JIS K 0068 (2001); vaporization temperature: 150° C.) using a coulometric titration water meter, and was evaluated as shown below. A smaller value indicates that the amount of water imported into a secondary battery due to the porous membrane is smaller.

A: Water content W of 500 mass ppm or less
B: Water content W of more than 500 mass ppm and not more than 600 mass ppm
C: Water content W of more than 600 mass ppm and not more than 700 mass ppm
D: Water content W of more than 700 mass ppm <Peel Strength of Porous Membrane>

A separator (porous membrane-equipped) was cut out as a rectangular shape of 100 mm in length and 10 mm in width to obtain a test piece. The test piece was positioned with the porous membrane surface underneath and cellophane tape (tape prescribed by JIS Z 1522) was attached to the porous membrane surface. One end of the separator substrate was pulled in a vertical direction at a pulling speed of 100 mm/minute to peel off the separator substrate and the stress during this peeling was measured (note that the cellophane tape was fixed to a test bed). This measurement was performed three times and an average value of the measurements was determined as the peel strength. The peel strength was evaluated by the following criteria. A larger peel strength indicates that the porous membrane has better adhesiveness to the separator substrate.

A: Peel strength of 100 N/m or more
B: Peel strength of at least 75 N/m and less than 100 N/m
C: Peel strength of less than 75 N/m <Cycle Characteristics of Secondary Battery>

A produced lithium ion secondary battery was subjected to charge/discharge cycling of charging to 4.2 V with a 0.2 C constant current and then discharging to 3.0 V with a 0.2 C constant current, both performed at an ambient temperature of 60° C. This charge/discharge cycling was repeated for 200 cycles and a ratio of the electrical capacity after completion of 200 cycles as a percentage relative to the electrical capacity after completion of 5 cycles was calculated. This measurement was performed 10 times using different cells and the average value of the calculated percentages was determined as the capacity maintenance rate. The capacity maintenance rate was evaluated by the following criteria. A larger capacity maintenance rate indicates smaller capacity reduction due to repeated charging and discharging, and better high-temperature cycle characteristics.

SA: Capacity maintenance rate of 85% or more
A: Capacity maintenance rate of at least 80% and less than 85%
B: Capacity maintenance rate of at least 70% and less than 80%
C: Capacity maintenance rate of at least 60% and less than 70%
D: Capacity maintenance rate of less than 60%

Example 1

<Production of Binder>

A reaction vessel equipped with a stirrer was charged with 70 parts of deionized water, 0.15 parts of sodium lauryl sulfate (EMAL 2F produced by Kao Corporation) as an emulsifier, and 0.5 parts of ammonium persulfate as a polymerization initiator. The gas phase of the reaction vessel was purged with nitrogen gas and the contents of the reaction vessel were heated to 60° C. A monomer composition was obtained in a separate vessel by mixing 50 parts of deionized water, 0.8 parts of sodium dodecylbenzenesulfonate as an emulsifier, 2 parts of acrylonitrile as a (meth)acrylonitrile monomer, 93.8 parts of butyl acrylate as a (meth)acrylic acid ester monomer, 2 parts of methacrylic acid as an acidic group-containing monomer, 1 part of allyl glycidyl ether and 1.2 parts of N-methylolacrylamide as crosslinkable monomers, and 0.15 parts of ethylenediaminetetraacetic acid sodium salt tetrahydrate (Chelest 400G produced by Chelest Corporation) as a chelating agent. The monomer composition was continuously added to the reaction vessel over 4 hours to perform polymerization. During the addition, the reaction was performed at 60°

C. After the addition, further stirring was performed for 3 hours at 70° C., and then the reaction was ended to yield a water dispersion of a particulate binder (acrylic polymer). The water dispersion was used to measure the glass transition temperature and volume-average particle diameter of the particulate binder. The results are shown in Table 1.

<Production of Dispersant>

A monomer composition was obtained by mixing 50 parts of deionized water, 80 parts of acrylic acid as a carboxylic acid group-containing monomer, and 19.92 parts of 2-acrylamido-2-methylpropane sulfonic acid and 0.08 parts of 2-(N-acryloyl)amino-2-methyl-1,3-propane-disulfonic acid as sulfonate group-containing monomers. Next, 150 parts of deionized water was charged to a four-neck flask equipped with a thermometer, a stirrer, and a reflux condenser, and was heated to 80° C. The monomer composition and 10 parts of a 30% sodium persulfate aqueous solution as a polymerization initiator were each continuously drip fed into the flask under stirring over 3 hours using a metering pump to perform a polymerization reaction at 80° C. After this drip feeding was completed, the system was maintained at 80° C. for 1 hour of aging to complete the polymerization reaction. Thereafter, 120 parts of a 32% sodium hydroxide aqueous solution was added into the flask to completely neutralize the reaction liquid and obtain an aqueous solution of a dispersant that was a water-soluble polymer (acrylic acid-sulfonic acid copolymer). The weight average molecular weight of the obtained water-soluble polymer was measured. The results are shown in Table 1.

<Production of Composition for Secondary Battery Porous Membrane>

Dry mixing was performed of 100 parts of α-alumina particles (produced by the Bayer process; LS-256 produced by Nippon Light Metal Co., Ltd.; volume-average particle diameter 0.8 μm; specific surface area: 6.4 $m^2/g$) as inorganic oxide particles X and 0.01 parts of aluminum hydroxide particles (H43M produced by Showa Denko K.K.; volume-average particle diameter: 0.8 μm; specific surface area: 6.7 $m^2/g$) as a metal hydroxide Y. With respect to 100.01 parts of the mixture obtained through the dry mixing, 0.5 parts in terms of solid content of the aqueous solution of the water-soluble polymer prepared as a dispersant and deionized water such that the solid content concentration was adjusted to 55% were added and mixed to obtain a mixed liquid. Next, this mixed liquid was subjected to one pass of dispersing using a media-less dispersing device (inline mill MKO produced by IKA Japan K.K.) under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of carboxymethyl cellulose (D1260 produced by Daicel Fine-Chem Ltd.; weight average molecular weight: 110,000 or more) as a thickener, and subsequently mixing 13.3 parts (6 parts in terms of amount of particulate binder) of the water dispersion of the particulate binder and 0.2 parts in terms of solid content of an aqueous solution of an ethylene oxide-propylene oxide copolymer (surfactant obtained through polymerization of ethylene oxide and propylene oxide in a polymerization ratio of 50:50 (molar ratio)) as a wetting agent.

The obtained preparation solution was filtered through a filter (average pore diameter: 10 μm) and was then passed through a magnetic filter (produced by TOK ENGINEERING Co., Ltd.) 10 times under conditions of room temperature and a magnetic flux density of 8,000 gauss to remove magnetic material and obtain a composition for a secondary battery porous membrane.

<Storage and Redispersion of Composition for Secondary Battery Porous Membrane>

The obtained composition for a porous membrane was transferred to a storage vessel (100 L drum), and was then tightly sealed therein and stored for 12 months at 20° C. Note that the amount of the composition for a porous membrane in the storage vessel was adjusted such that volume of space formed in the storage vessel was 30 vol. % of the capacity of the storage vessel, and then the storage vessel was tightly sealed.

After 12 months of storage, the storage vessel was set in a stirring device 2 illustrated in FIG. 1. The stirring device 2 illustrated in FIG. 1 is in a state in which a storage vessel 8 is being held by a storage vessel holding portion 18. The stirring device 2 includes a motor 14 and a rotating shaft for storage vessel rotation 16. The angle θ between a horizontal axis 12 and an axial line passing perpendicularly through a lower surface 4 and an upper surface 6 of the storage vessel 8 was fixed as 70°.

The composition for a porous membrane was redispersed through 32 passes of a stirred mixing process in which each pass of the stirred mixing process included 15 rotations of the storage vessel in a backward direction relative to the plane of the drawing in FIG. 1 (arrow direction in FIG. 1) and then 15 rotations of the storage vessel in a forward direction relative to the plane of the drawing in FIG. 1 (opposite direction to the arrow direction in FIG. 1). The redispersed composition for a porous membrane was used to evaluate redispersibility. The results are shown in Table 1.

<Production of Porous Membrane and Separator>

A porous substrate made from polyethylene was prepared as an organic separator substrate (thickness: 12 μm). The redispersed composition for a porous membrane described above was applied onto one side of the prepared organic separator substrate and was dried for 3 minutes at 50° C. Through this process, a separator including a porous membrane (thickness: 4 μm) was produced. The obtained separator was used to evaluate the peel strength of the porous membrane and the water content of the separator. The results are shown in Table 1.

<Production of Positive Electrode>

A slurry composition for a positive electrode was produced by mixing 95 parts of $LiCoO_2$ as a positive electrode active material, 2 parts of acetylene black (HS-100 produced by Denki Kagaku Kogyo Kabushiki Kaisha) as a conductive material, 3 parts by solid content equivalents of polyvinylidene fluoride (KF-1100 produced by Kureha Corporation) as a binder for a positive electrode mixed material layer, and 20 parts of N-methylpyrrolidone.

The obtained slurry composition for a positive electrode was applied onto aluminum foil (current collector) of 18 μm in thickness using a comma coater and was dried for 3 hours at 120° C. to obtain a positive electrode web. The positive electrode web was rolled by roll pressing to obtain a positive electrode of 100 μm in thickness.

<Production of Negative Electrode>

A 5 MPa pressure vessel equipped with a stirrer was charged with 33 parts of 1,3-butadiene, 3.5 parts of itaconic acid, 63.5 parts of styrene, 4 parts of sodium dodecylbenzenesulfonate as an emulsifier, 200 parts of deionized water, and 0.5 parts of potassium persulfate as a polymerization initiator. The contents of the pressure vessel were sufficiently stirred and were then heated to 50° C. to initiate polymerization. After 12 hours had elapsed, steam was introduced into the pressure vessel to remove unreacted monomers. As a result, a water dispersion containing a desired binder for a negative electrode mixed material layer was obtained.

A planetary mixer equipped with a disper blade was charged with 70 parts of artificial graphite (specific surface area: 4 m$^2$/g; volume-average particle diameter: 24.5 μm) and 30 parts of SiO$_x$ (produced by Shin-Etsu Chemical Co., Ltd.; volume-average particle diameter: 5 μm) as negative electrode active materials, and 1 part in terms of solid content of a 1% aqueous solution of carboxymethyl cellulose (BSH-12 produced by DKS Co., Ltd.) as a thickener. The solid content concentration was adjusted to 55% with deionized water and then mixing was performed for 60 minutes at 25° C. Next, the solid content concentration was adjusted to 52% with deionized water. Further stirring was subsequently performed for 15 minutes at 25° C. to yield a mixed liquid. Next, 1.0 parts in terms of solid content of the water dispersion containing the binder for a negative electrode mixed material layer was added to this mixed liquid. The final solid content concentration was adjusted to 50% through addition of deionized water and further stirring was performed for 10 minutes. The resultant mixture was subjected to a defoaming process under reduced pressure to yield a slurry composition for a negative electrode having good fluidity.

The slurry composition for a negative electrode was applied onto copper foil (current collector) of 20 μm in thickness using a comma coater such as to have a film thickness after drying of approximately 150 μm. The slurry composition for a negative electrode was then dried by conveying the copper foil inside of a 60° C. oven for 2 minutes at a speed of 0.5 m/minute. Heat treatment was subsequently performed for 2 minutes at 120° C. to obtain a negative electrode web. The negative electrode web was rolled by roll pressing to obtain a negative electrode of 100 μm in thickness.

<Production of Lithium Ion Secondary Battery>

The obtained positive electrode was cut out as a circle of 13 mm in diameter. Next, the obtained separator was cut out as a circle of 18 mm in diameter and was positioned such that the porous membrane was in contact with a surface at the positive electrode mixed material layer side of the positive electrode. Moreover, the obtained negative electrode was cut out as a circle of 14 mm in diameter and was positioned such that a surface at the negative electrode mixed material layer side of the negative electrode was in contact with the separator substrate surface of the separator. In addition, an expanded metal was positioned on a surface at the current collector side of the negative electrode to obtain a laminate. The laminate was then housed in a coin-type case made of stainless steel (diameter: 20 mm; height: 1.8 mm; stainless steel thickness: 0.25 mm) in which packing made of polypropylene had been installed. An electrolysis solution was injected into the case such that air did not remain in the case. The electrolysis solution was a solution obtained by dissolving LiPF$_6$ with a concentration of 1 M in a mixed solvent formed through mixing of ethylene carbonate (EC), ethyl methyl carbonate (EMC), and vinylene carbonate (VC) in an EC:EMC:VC ratio of 68.5:30.0:1.5 (volume ratio at 20° C.). Next, a stainless steel cap of 0.2 mm in thickness was placed on and fixed to the case via the polypropylene packing to seal the battery can and thereby produce a lithium ion secondary battery (coin cell CR2032) in the form of a full cell-type coin cell of 20 mm in diameter and approximately 3.2 mm in thickness. The obtained lithium ion secondary battery was used to evaluate cycle characteristics. The results are shown in Table 1.

Example 2

A binder, a dispersant, a composition for a porous membrane, a porous membrane, a separator, a negative electrode, a positive electrode, and a lithium ion secondary battery were produced and evaluations were performed in the same way as in Example 1 with the exception that α-alumina particles having a volume-average particle diameter of 0.4 μm and a specific surface area of 7.4 m$^2$/g were used as the inorganic oxide particles X in production of the composition for a porous membrane. The results are shown in Table 1.

Examples 3 to 5

A binder, a dispersant, a composition for a porous membrane, a porous membrane, a separator, a negative electrode, a positive electrode, and a lithium ion secondary battery were produced and evaluations were performed in the same way as in Example 1 with the exception that the amount of aluminum hydroxide particles used as the metal hydroxide Y in production of the composition for a porous membrane was changed as shown in Table 1. The results are shown in Table 1.

Example 6

A binder, a porous membrane, a separator, a negative electrode, a positive electrode, and a lithium ion secondary battery were produced and evaluations were performed in the same way as in Example 1 with the exception that a composition for a porous membrane obtained as described below was used. The results are shown in Table 1.

<Production of Composition for Secondary Battery Porous Membrane>

A mixture of 100 parts of surface-treated α-alumina particles (volume-average particle diameter: 0.8 μm; specific surface area: 6.4 m$^2$/g) as inorganic oxide particles X and 0.01 parts of surface-treated aluminum hydroxide particles (volume-average particle diameter: 0.8 μm) as a metal hydroxide Y was obtained by mixing α-alumina particles (produced by Bayer process; LS-256 produced by Nippon Light Metal Co., Ltd.; volume-average particle diameter: 0.8 μm; specific surface area: 6.4 m$^2$/g), aluminum hydroxide particles (H43M produced by Showa Denko K.K.; volume-average particle diameter: 0.8 μm; specific surface area: 6.7 m$^2$/g), and a 0.5% solution (solvent: methyl ethyl ketone) of 3-aminopropyltriethoxysilane as a reactive coupling agent, and then removing the methyl ethyl ketone used as a solvent by drying. Deionized water was added to and mixed with 100.01 parts of the obtained mixture to adjust the solid content concentration to 55% and obtain a mixed liquid. Next, this mixed liquid was subjected to one pass of dispersing using a media-less dispersing device (inline mill MKO produced by IKA Japan K.K.) under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of carboxymethyl cellulose (D1260 produced by Daicel Fine-Chem Ltd.; weight average molecular weight: 110,000 or more) as a thickener, and subsequently mixing 13.3 parts (6 parts in terms of amount of particulate binder) of the water dispersion of the particulate binder, and 0.3 parts in terms of solid content of an aqueous solution of an ethylene oxide-propylene oxide copolymer (surfactant obtained through polymerization of ethylene oxide and propylene oxide in a polymerization ratio of 50:50 (molar ratio)), 0.2 parts of sodium dodecylbenzenesulfonate, and 0.2 parts of sodium laurate as wetting agents.

The obtained preparation solution was filtered through a filter (average pore diameter: 10 μm) and was then passed through a magnetic filter (produced by TOK ENGINEERING Co., Ltd.) 10 times under conditions of room temperature and a magnetic flux density of 8,000 gauss to remove magnetic material and obtain a composition for a secondary battery porous membrane.

Examples 7 to 10

A binder, a composition for a porous membrane, a porous membrane, a separator, a negative electrode, a positive electrode, and a lithium ion secondary battery were produced and evaluations were performed in the same way as in Example 6 with the exception that in production of the composition for a porous membrane, 0.2 parts of sodium dodecylbenzenesulfonate and 0.2 parts of sodium laurate used as wetting agents were replaced with 0.3 parts of lithium laurate (Example 7), 0.3 parts of lithium lauryl sulfonate (Example 8), 0.3 parts of lithium caprate (Example 9), or 0.3 parts of lithium butyrate (Example 10). The results are shown in Table 1 (Examples 7 and 8) and Table 2 (Examples 9 and 10).

Example 11

A binder, a composition for a porous membrane, a porous membrane, a separator, a negative electrode, a positive electrode, and a lithium ion secondary battery were produced and evaluations were performed in the same way as in Example 6 with the exception that in production of the composition for a porous membrane, a dispersant was not used, the 4% aqueous solution of carboxymethyl cellulose used as a thickener was replaced with an aqueous solution of polyvinyl alcohol (P-12 produced by Isono Kagaku; weight average molecular weight: 110,000 or more) in an amount of 1.5 parts of polyvinyl alcohol, and the amount of the ethylene oxide-propylene oxide copolymer used as a wetting agent was changed to 0.2 parts. The results are shown in Table 2.

Example 12

A binder, a porous membrane, a separator, a negative electrode, a positive electrode, and a lithium ion secondary battery were produced and evaluations were performed in the same way as in Example 1 with the exception that a composition for a porous membrane obtained as described below was used. The results are shown in Table 2.
<Production of Magnesium Hydroxide Particles and Magnesium Oxide Particles>

An aqueous solution A was produced by dissolving 11.8 parts of magnesium chloride in 250 parts of deionized water. An aqueous solution B was separately produced by dissolving an aqueous solution of 6.6 parts of sodium hydroxide dissolved in 50 parts of deionized water. The aqueous solution B was gradually added to the aqueous solution A under stirring at room temperature (25° C.) to produce a dispersion liquid of magnesium hydroxide colloid. The obtained dispersion liquid was filtered, and the filtration residue was washed with water and then dried at 100° C. to obtain magnesium hydroxide particles.

A water dispersion of magnesium hydroxide colloid was separately produced by the same operation as described above. The obtained dispersion liquid was filtered, and the filtration residue was washed with water and then dried at 600° C. to 800° C. to obtain magnesium oxide particles.
<Production of Composition for Secondary Battery Porous Membrane>

A mixture formed from 100 parts of surface-treated magnesium oxide particles (volume-average particle diameter: 0.7 μm; specific surface area 7.2 m$^2$/g) as inorganic oxide particles X and 3 parts of surface-treated magnesium hydroxide particles (volume-average particle diameter: 0.7 μm) as a metal hydroxide Y was obtained by mixing the above-described magnesium oxide particles, the above-described magnesium hydroxide particles, and a 0.5% solution (solvent: methyl ethyl ketone) of 3-aminopropyltriethoxysilane as a reactive coupling agent, and then removing the methyl ethyl ketone used as a solvent by drying. Deionized water was added to and mixed with 103 parts of the obtained mixture to adjust the solid content concentration to 55% and yield a mixed liquid. Next, this mixed liquid was subjected to one pass of dispersing using a media-less dispersing device (inline mill MKO produced by IKA Japan K.K.) under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of carboxymethyl cellulose (D1260 produced by Daicel FineChem Ltd.; weight average molecular weight: 110,000 or more) as a thickener, and subsequently mixing 13.3 parts (6 parts in terms of amount of particulate binder) of the water dispersion of the particulate binder, and 0.3 parts in terms of solid content of an aqueous solution of an ethylene oxide-propylene oxide copolymer (surfactant obtained through polymerization of ethylene oxide and propylene oxide in a polymerization ratio of 50:50 (molar ratio)), 0.2 parts of sodium dodecylbenzenesulfonate, and 0.2 parts of sodium laurate as wetting agents.

The obtained preparation solution was filtered through a filter (average pore diameter: 10 μm) and was then passed through a magnetic filter (produced by TOK ENGINEERING Co., Ltd.) 10 times under conditions of room temperature and a magnetic flux density of 8,000 gauss to remove magnetic material and obtain a composition for a secondary battery porous membrane.

Example 13

A binder, a porous membrane, a separator, a negative electrode, a positive electrode, and a lithium ion secondary battery were produced and evaluations were performed in the same way as in Example 1 with the exception that a composition for a porous membrane obtained as described below was used. The results are shown in Table 2.
<Production of Magnesium Oxide Particles>

Magnesium oxide particles were obtained in the same way as in Example 12.
<Production of Composition for Secondary Battery Porous Membrane>

A mixture of 80 parts of surface-treated α-alumina particles (volume-average particle diameter: 0.8 μm; specific surface area: 6.4 m$^2$/g) and 20 parts of surface-treated magnesium oxide particles (volume-average particle diameter: 0.7 μm; specific surface area: 7.2 m$^2$/g) as inorganic oxide particles X, and 0.01 parts of surface-treated aluminum hydroxide particles (volume-average particle diameter: 0.8 µm) as a metal hydroxide Y was obtained by mixing α-alumina particles (produced by Bayer process; LS-256 produced by Nippon Light Metal Co., Ltd.; volume-average particle diameter: 0.8 µm; specific surface area: 6.4 m$^2$/g), the above-described magnesium oxide particles, aluminum hydroxide particles (H43M produced by Showa Denko K.K.; volume-average particle diameter: 0.8 µm), and a 0.5% solution (solvent: methyl ethyl ketone) of 3-aminopropyltriethoxysilane as a reactive coupling agent, and then removing the methyl ethyl ketone used as a solvent by drying. Deionized water was added to and mixed with 100.01 parts of the obtained mixture to adjust the solid content concentration to 55% and obtain a mixed liquid. Next, this mixed liquid was subjected to one pass of dispersing using a media-less dispersing device (inline mill MKO produced by IKA Japan K.K.) under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of carboxymethyl cellulose (D1260 produced by Daicel Fine-Chem Ltd.; weight average molecular weight: 110,000 or more) as a thickener, and subsequently mixing 13.3 parts (6 parts in terms of amount of particulate binder) of the water dispersion of the particulate binder, and 0.3 parts in terms of solid content of an aqueous solution of an ethylene oxide-propylene oxide copolymer (surfactant obtained through polymerization of ethylene oxide and propylene oxide in a polymerization ratio of 50:50 (molar ratio)), 0.2 parts of sodium dodecylbenzenesulfonate, and 0.2 parts of sodium laurate as wetting agents.

The obtained preparation solution was filtered through a filter (average pore diameter: 10 µm) and was then passed through a magnetic filter (produced by TOK ENGINEERING Co., Ltd.) 10 times under conditions of room temperature and a magnetic flux density of 8,000 gauss to remove magnetic material and obtain a composition for a secondary battery porous membrane.

Example 14

A binder, a porous membrane, a separator, a negative electrode, a positive electrode, and a lithium ion secondary battery were produced and evaluations were performed in the same way as in Example 1 with the exception that a composition for a porous membrane obtained as described below was used. The results are shown in Table 2.
<Production of Magnesium Oxide Particles>
Magnesium oxide particles were obtained in the same way as in Example 12.
<Production of Composition for Secondary Battery Porous Membrane>
α-Alumina particles (produced by Bayer process; LS-256 produced by Nippon Light Metal Co., Ltd.; volume-average particle diameter: 0.8 µm; specific surface area: 6.4 m$^2$/g), the above-described magnesium oxide particles, and a 0.5% solution (solvent: methyl ethyl ketone) of 3-aminopropyltriethoxysilane as a reactive coupling agent were mixed, and then the methyl ethyl ketone used as a solvent was removed by drying. After removal of the methyl ethyl ketone, aluminum hydroxide particles (H43M produced by Showa Denko K.K.; volume-average particle diameter: 0.8 µm) were added to the resultant dried product to obtain a mixture formed from 80 parts of surface-treated α-alumina particles (volume-average particle diameter: 0.8 µm; specific surface area: 6.4 m$^2$/g) and 20 parts of surface-treated magnesium oxide particles (volume-average particle diameter: 0.7 µm; specific surface area: 7.2 m$^2$/g) as inorganic oxide particles X and 0.01 parts of aluminum hydroxide particles (volume-average particle diameter: 0.8 µm) as a metal hydroxide Y. Deionized water was added to and mixed with 100.01 parts of the obtained mixture to adjust the solid content concentration to 55% and obtain a mixed liquid. Next, this mixed liquid was subjected to one pass of dispersing using a media-less dispersing device (inline mill MKO produced by IKA Japan K.K.) under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of carboxymethyl cellulose (D1260 produced by Daicel Fine-Chem Ltd.; weight average molecular weight: 110,000 or more) as a thickener, and subsequently mixing 13.3 parts (6 parts in terms of amount of particulate binder) of the water dispersion of the particulate binder, and 0.2 parts in terms of solid content of an aqueous solution of an ethylene oxide-propylene oxide copolymer (surfactant obtained through polymerization of ethylene oxide and propylene oxide in a polymerization ratio of 50:50 (molar ratio)), 0.2 parts of sodium dodecylbenzenesulfonate, and 0.2 parts of sodium laurate as wetting agents.

The obtained preparation solution was filtered through a filter (average pore diameter: 10 µm) and was then passed through a magnetic filter (produced by TOK ENGINEERING Co., Ltd.) 10 times under conditions of room temperature and a magnetic flux density of 8,000 gauss to remove magnetic material and obtain a composition for a secondary battery porous membrane.

Comparative Example 1

A binder, a dispersant, a composition for a porous membrane, a porous membrane, a separator, a negative electrode, a positive electrode, and a lithium ion secondary battery were produced and evaluations were performed in the same way as in Example 1 with the exception that a metal hydroxide Y was not used in production of the composition for a porous membrane. The results are shown in Table 2.

Comparative Example 2

A binder, a dispersant, a composition for a porous membrane, a porous membrane, a separator, a negative electrode, a positive electrode, and a lithium ion secondary battery were produced and evaluations were performed in the same way as in Example 1 with the exception that the amount of aluminum hydroxide used as a metal hydroxide Y in production of the composition for a porous membrane was changed as shown in Table 2. The results are shown in Table 2.

Comparative Example 3

A binder, a dispersant, a composition for a porous membrane, a porous membrane, a separator, a negative electrode, a positive electrode, and a lithium ion secondary battery were produced and evaluations were performed in the same way as in Example 1 with the exception that in production of the composition for a porous membrane, activated alumina particles (volume-average particle diameter: 0.8 μm; specific surface area: 100 m²/g) obtained through heat treatment of the above-described aluminum hydroxide particles (H43M produced by Showa Denko K.K.) at 230° C. were used as the inorganic oxide particles X, and a metal hydroxide Y was not used. The results are shown in Table 2.

In Tables 1 and 2, shown below:
"ACL" indicates acrylic polymer;
"CMC" indicates carboxymethyl cellulose;
"EO/PO" indicates ethylene oxide-propylene oxide copolymer; and
"PVA" indicates polyvinyl alcohol.

TABLE 1

|  |  | Example 1 | Example 2 | Example 3 | Example 4 | Example 5 | Example 6 | Example 7 | Example 8 |
|---|---|---|---|---|---|---|---|---|---|
| Inorganic oxide particles X | Type | α-Alumina | α-Alumina | α-Alumina | α-Alumina | α-Alumina | α-Alumina | α-Alumina | α-Alumina |
|  | Volume-average particle diameter [μm] | 0.8 | 0.4 | 0.8 | 0.8 | 0.8 | 0.8 | 0.8 | 0.8 |
|  | Specific surface area [m²/g] | 6.4 | 7.4 | 6.4 | 6.4 | 6.4 | 6.4 | 6.4 | 6.4 |
|  | Amount [parts by mass] | 100 | 100 | 100 | 100 | 100 | 100 | 100 | 100 |
|  | Proportion constituted among total solid content [mass %] | 92.4 | 92.4 | 92.0 | 85.3 | 92.4 | 92.4 | 92.5 | 92.5 |
|  | Surface treatment | No | No | No | No | No | Yes | Yes | Yes |
| Metal hydroxide Y | Type | Al hydroxide | Al hydroxide | Al hydroxide | Al hydroxide | Al hydroxide | Al hydroxide | Al hydroxide | Al hydroxide |
|  | Volume-average particle diameter [μm] | 0.8 | 0.8 | 0.8 | 0.8 | 0.8 | 0.8 | 0.8 | 0.8 |
|  | X/Y particle diameter ratio [—] | 1.00 | 0.50 | 1.00 | 1.00 | 1.00 | 1.00 | 1.00 | 1.00 |
|  | Amount [parts by mass] | 0.01 | 0.01 | 0.5 | 9 | 0.005 | 0.01 | 0.01 | 0.01 |
|  | Surface treatment | No | No | No | No | No | Yes | Yes | Yes |
| Binder | Type | ACL | ACL | ACL | ACL | ACL | ACL | ACL | ACL |
|  | Glass transition temperature [° C.] | −47 | −47 | −47 | −47 | −47 | −47 | −47 | −47 |
|  | Volume-average particle diameter [nm] | 350 | 350 | 350 | 350 | 350 | 350 | 350 | 350 |
|  | Amount [parts by mass] | 6 | 6 | 6 | 6 | 6 | 6 | 6 | 6 |
| Dispersant | Sulfonate group/carboxylic acid group monomer ratio [—] | 0.25 | 0.25 | 0.25 | 0.25 | 0.25 | — | — | — |
|  | Weight average molecular weight [—] | 6000 | 6000 | 6000 | 6000 | 6000 | — | — | — |
|  | Amount [parts by mass] | 0.5 | 0.5 | 0.5 | 0.5 | 0.5 | — | — | — |
| Thickener | Type | CMC | CMC | CMC | CMC | CMC | CMC | CMC | CMC |
|  | Amount [parts by mass] | 1.5 | 1.5 | 1.5 | 1.5 | 1.5 | 1.5 | 1.5 | 1.5 |
| Wetting agent | EO/PO [parts by mass] | 0.2 | 0.2 | 0.2 | 0.2 | 0.2 | 0.3 | 0.3 | 0.3 |
|  | Na dodecylbenzenesulfonate [parts by mass] | — | — | — | — | — | 0.2 | — | — |
|  | Na laurate [parts by mass] | — | — | — | — | — | 0.2 | — | — |
|  | Li laurate [parts by mass] | — | — | — | — | — | — | 0.3 | — |
|  | Li lauryl sulfonate [parts by mass] | — | — | — | — | — | — | — | 0.3 |
|  | Li caprate [parts by mass] | — | — | — | — | — | — | — | — |
|  | Li butyrate [parts by mass] | — | — | — | — | — | — | — | — |
| Evaluation | Redispersibility | A | A | A | B | B | A | B | A |
|  | Peel strength | A | A | A | B | B | B | B | B |
|  | Water content | A | A | A | B | A | A | A | A |
|  | Cycle characteristics | A | A | A | B | B | SA | A | SA |

TABLE 2

|  |  | Example 9 | Example 10 | Example 11 | Example 12 | Example 13 | Example 14 | Comparative Example 1 | Comparative Example 2 | Comparative Example 3 |
|---|---|---|---|---|---|---|---|---|---|---|
| Inorganic oxide particles X | Type | α-Alumina | α-Alumina | α-Alumina | Mg oxide | α-Alumina/Mg oxide | α-Alumina/Mg oxide | α-Alumina | α-Alumina | Activated alumina |
|  | Volume-average particle diameter [μm] | 0.8 | 0.8 | 0.8 | 0.7 | 0.8/0.7 | 0.8/0.7 | 0.8 | 0.8 | 0.8 |
|  | Specific surface area [m²/g] | 6.4 | 6.4 | 6.4 | 7.2 | 6.4/7.2 | 6.4/7.2 | 6.4 | 6.4 | 100 |
|  | Amount [parts by mass] | 100 | 100 | 100 | 100 | 80/20 | 80/20 | 100 | 100 | 100 |
|  | Proportion constituted among total solid content [mass %] | 92.5 | 92.5 | 92.5 | 89.9 | 92.4 | 92.5 | 92.4 | 72.4 | 92.4 |
|  | Surface treatment | Yes | Yes | Yes | Yes | Yes | Yes | No | No | No |
| Metal hydroxide Y | Type | Al hydroxide | Al hydroxide | Al hydroxide | Mg hydroxide | Al hydroxide | Al hydroxide | — | Al hydroxide | — |
|  | Volume-average particle diameter [μm] | 0.8 | 0.8 | 0.8 | 0.7 | 0.8 | 0.8 | — | 0.8 | — |
|  | X/Y particle diameter ratio [—] | 1.00 | 1.00 | 1.00 | 1.00 | 0.98 | 0.98 | — | 1.00 | — |
|  | Amount [parts by mass] | 0.01 | 0.01 | 0.01 | 3 | 0.01 | 0.01 | — | 30 | — |
|  | Surface treatment | Yes | Yes | Yes | Yes | Yes | No | No | No | No |

TABLE 2-continued

|  |  | Example 9 | Example 10 | Example 11 | Example 12 | Example 13 | Example 14 | Comparative Example 1 | Comparative Example 2 | Comparative Example 3 |
|---|---|---|---|---|---|---|---|---|---|---|
| Binder | Type | ACL | ACL | ACL | ACL | ACL | ACL | ACL | ACL | ACL |
|  | Glass transition temperature [° C.] | −47 | −47 | −47 | −47 | −47 | −47 | −47 | −47 | −47 |
|  | Volume-average particle diameter [nm] | 350 | 350 | 350 | 350 | 350 | 350 | 350 | 350 | 350 |
|  | Amount [parts by mass] | 6 | 6 | 6 | 6 | 6 | 6 | 6 | 6 | 6 |
| Dispersant | Sulfonate group/carboxylic acid group monomer ratio [—] | — | — | — | — | — | — | 0.25 | 0.25 | 0.25 |
|  | Weight average molecular weight [—] | — | — | — | — | — | — | 6000 | 6000 | 6000 |
|  | Amount [parts by mass] | — | — | — | — | — | — | 0.5 | 0.5 | 0.5 |
| Thickener | Type | CMC | CMC | PVA | CMC | CMC | CMC | CMC | CMC | CMC |
|  | Amount [parts by mass] | 1.5 | 1.5 | 1.5 | 1.5 | 1.5 | 1.5 | 1.5 | 1.5 | 1.5 |
| Wetting agent | EO/PO [parts by mass] | 0.3 | 0.3 | 0.2 | 0.3 | 0.3 | 0.2 | 0.2 | 0.2 | 0.2 |
|  | Na dodecylbenzenesulfonate [parts by mass] | — | — | 0.2 | 0.2 | 0.2 | 0.2 | — | — | — |
|  | Na laurate [parts by mass] | — | — | 0.2 | 0.2 | 0.2 | 0.2 | — | — | — |
|  | Li laurate [parts by mass] | — | — | — | — | — | — | — | — | — |
|  | Li lauryl sulfonate [parts by mass] | — | — | — | — | — | — | — | — | — |
|  | Li caprate [parts by mass] | 0.3 | — | — | — | — | — | — | — | — |
|  | Li butyrate [parts by mass] | — | 0.3 | — | — | — | — | — | — | — |
| Evaluation | Redispersbility | B | B | B | A | A | A | C | D | D |
|  | Peel strength | C | A | A | A | A | B | C | C | C |
|  | Water content | B | C | C | B | B | B | A | C | D |
|  | Cycle characteristics | B | B | B | B | SA | A | C | C | D |

It can be seen from Examples 1 to 14 and Comparative Examples 1 to 3 in Tables 1 and 2 that, in the case of Examples 1 to 14, a composition for a porous membrane having excellent redispersibility, a porous membrane having excellent peel strength, and a secondary battery having excellent cycle characteristics and reduced water importation were obtained. Moreover, it can be seen from Examples 1 and 3 to 5 that by adjusting the amount of the metal hydroxide Y, the redispersibility of the composition for a porous membrane, the peel strength of the porous membrane, and the cycle characteristics of the secondary battery can be further improved, and water importation into the secondary battery can be further reduced.

INDUSTRIAL APPLICABILITY

According to this disclosure, it is possible to provide a composition for a secondary battery porous membrane having excellent redispersibility.

Moreover, according to this disclosure it is possible to provide a porous membrane for a secondary battery that has excellent peel strength and enables a secondary battery to display excellent cycle characteristics.

Furthermore, according to this disclosure, it is possible to provide a secondary battery having excellent cycle characteristics.

REFERENCE SIGNS LIST

2 stirring device
4 storage vessel lower surface
6 storage vessel upper surface
8 storage vessel
storage vessel axial line
12 horizontal axis
14 motor
16 rotating shaft for storage vessel rotation
18 storage vessel holding portion

The invention claimed is:

1. A composition for a secondary battery porous membrane comprising:
   inorganic oxide particles X;
   a metal hydroxide Y;
   a binder;
   a wetting agent;
   and water, wherein
   the metal hydroxide Y is a divalent or trivalent hydroxide,
   the metal hydroxide Y is contained in an amount of at least 0.001 parts by mass and not more than 10 parts by mass per 100 parts by mass of the inorganic oxide particles X, and
   the wetting agent is at least one selected from the group consisting of an ethylene oxide-propylene oxide copolymer and a monovalent low-molecular weight anionic surfactant.

2. The composition for a secondary battery porous membrane according to claim 1, wherein
   the inorganic oxide particles X have a specific surface area of at least 3 m$^2$/g and not more than 10 m$^2$/g.

3. The composition for a secondary battery porous membrane according to claim 1, wherein
   the inorganic oxide particles X constitute a proportion of 50 mass % or more among total solid content.

4. The composition for a secondary battery porous membrane according to claim 1, wherein
   the wetting agent is contained in an amount of 0.05 parts by mass or more per 100 parts by mass of the inorganic oxide particles X.

5. The composition for a secondary battery porous membrane according to claim 1, wherein
   the inorganic oxide particles X have undergone surface treatment with a reactive coupling agent.

6. The composition for a secondary battery porous membrane according to claim 5, wherein
   the reactive coupling agent is at least one selected from the group consisting of a titanium-based coupling agent, a silane coupling agent, and an aluminum-based coupling agent.

7. The composition for a secondary battery porous membrane according to claim 1, wherein
the metal hydroxide Y has undergone surface treatment with a reactive coupling agent.

8. A porous membrane for a secondary battery formed from the composition for a secondary battery porous membrane according to claim 1.

9. A secondary battery comprising the porous membrane for a secondary battery according to claim 8.

* * * * *